United States Patent [19]

Anderson et al.

[11] Patent Number: 5,235,643
[45] Date of Patent: Aug. 10, 1993

[54] SATELLITE RECEIVER RETUNING SYSTEM

[76] Inventors: Steven E. Anderson, 5521 Taft Ave., La Jolla, Calif. 92037; Nancy S. Lucore, 1548 Sapphire La., Vista, Calif. 92083; Christopher J. Bennett, 4820 Vista St., San Diego, Calif. 92116

[21] Appl. No.: 703,117
[22] Filed: May 21, 1991
[51] Int. Cl.$^5$ ............................................. H04K 1/00
[52] U.S. Cl. ...................................... 380/33; 380/10; 380/20
[58] Field of Search ...................... 380/10, 20, 33, 34

[56] References Cited

U.S. PATENT DOCUMENTS

| | | | |
|---|---|---|---|
| 3,789,131 | 1/1974 | Harney | 380/10 |
| 3,885,089 | 5/1975 | Callais et al. | 380/20 |
| 4,418,425 | 11/1983 | Fennel, Jr. et al. | 380/34 |
| 4,484,027 | 11/1984 | Lee et al. | 380/20 |
| 4,829,569 | 5/1989 | Seth-Smith et al. | 380/10 |
| 4,985,895 | 1/1991 | Pelkey . | |
| 5,036,537 | 7/1991 | Jeffers et al. | 380/20 |

Primary Examiner—Salvatore Cangialosi
Attorney, Agent, or Firm—Allan Jacobson

[57] ABSTRACT

A remotely retunable receiver for use in a satellite video programming distribution system includes the capability to retune groups of subscribers to different satellite feeds during a blackout of a video programming event. To achieve flexible control over program blackouts, a receiver retune command message is selectively sent to desired groups of descramblers at CATV satellite downlinks. The retune command message identifies an alternate satellite feed and a time for which the satellite receiver is to tune to the alternate satellite feed. The receiver stores the retune command, and at the appropriate time retunes the satellite receiver to the identified alternate feed. By command messages received on the alternate feed, the group of blacked out satellite receivers are returned to the original programming channel at the end of the blacked out event. Also provided is a command message for local insertion of demographically targeted advertising which command message designates the start time and duration of the local insertion. Furthermore, a home channel command is provided to individual satellite receivers to return the receiver to a home satellite feed in the event of an unrecoverable error.

20 Claims, 7 Drawing Sheets

RETUNE MESSAGE

| SATELLITE DESIGNATOR | TRANSPONDER | START TIME | TIER INDICATOR |
|---|---|---|---|

HOME CHANNEL MESSAGE

| SATELLITE DESIGNATOR | TRANSPONDER | TIER INDICATOR |
|---|---|---|

LOCAL INSERTION MESSAGE

| SWITCH PORT NUMBER | START TIME | DURATION |
|---|---|---|

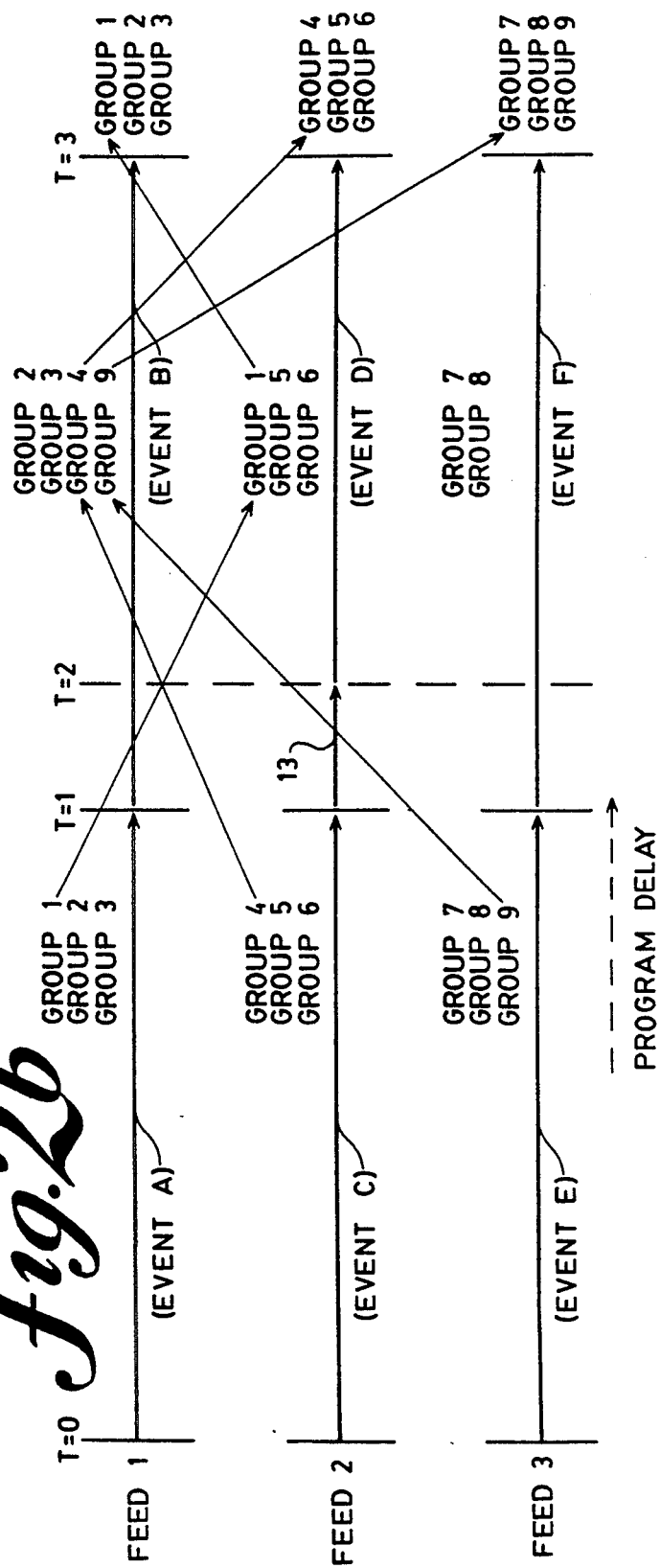

| TIME | FEED 1<br>(SATELLITE 1, TRANSPONDER 1) | FEED 2<br>(SATELLITE 2, TRANSPONDER 2) |
|---|---|---|
| T = 0 | 24 —<br>SATELLITE 2<br>TRANSPONDER 2<br>TIME 1<br>TIER 1<br><br>28 —<br>SATELLITE 2<br>TRANSPONDER 2<br>TIME 1<br>TIER 1 | 26 —<br>SATELLITE 1<br>TRANSPONDER 1<br>TIME 1<br>TIER 4<br><br>29 —<br>SATELLITE 1<br>TRANSPONDER 1<br>TIME 0<br>TIER 1<br><br>30 —<br>SATELLITE 1<br>TRANSPONDER 1<br>TIME 2<br>TIER 4 |
| T = 1 | | |
| T = 2 | 32 —<br>SATELLITE 2<br>TRANSPONDER 2<br>TIME 3<br>TIER 4<br><br>36 —<br>SATELLITE 3<br>TRANSPONDER 3<br>TIME 3<br>TIER 9 | 34 —<br>SATELLITE 1<br>TRANSPONDER 1<br>TIME 3<br>TIER 1 |
| T = 3 | | |

*fig.2c*

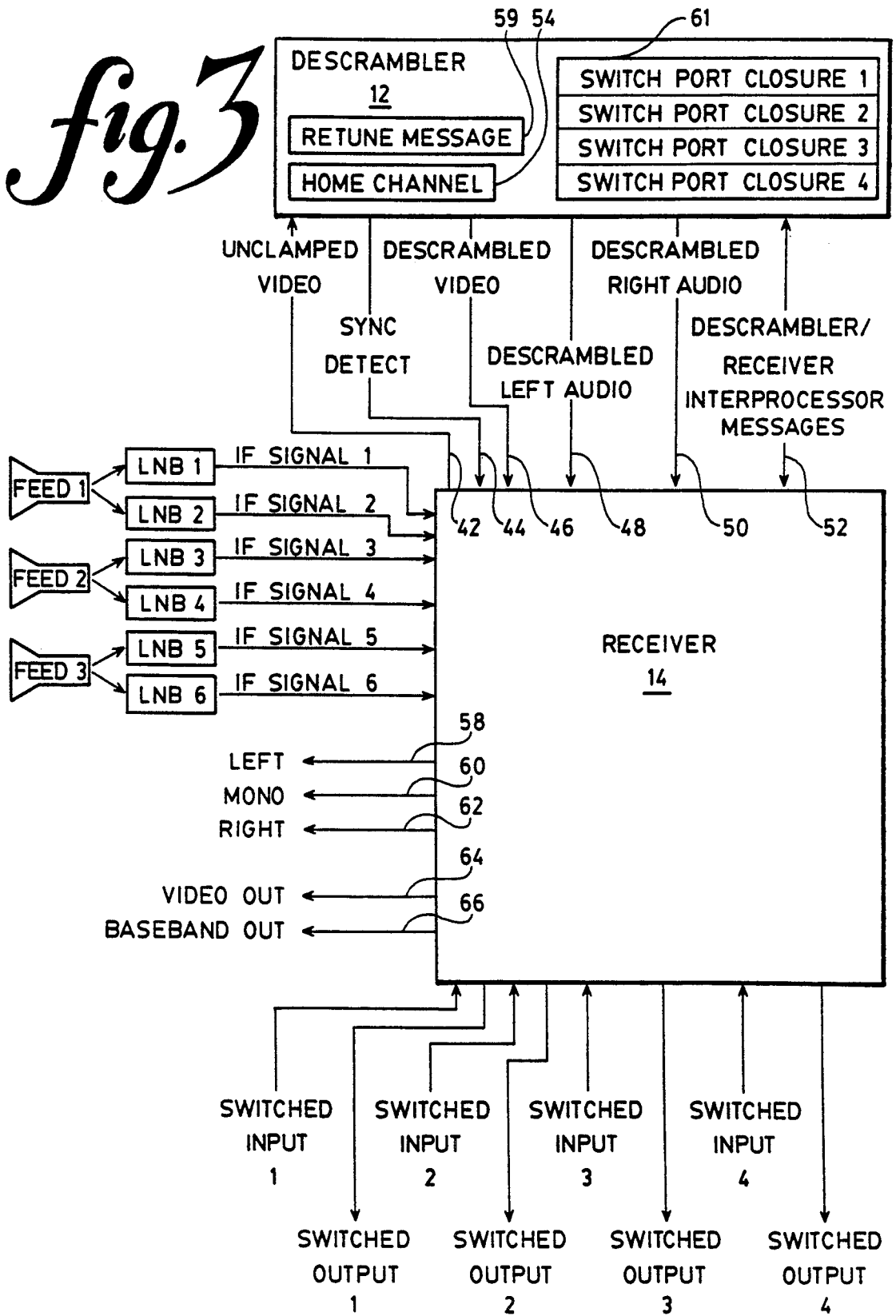

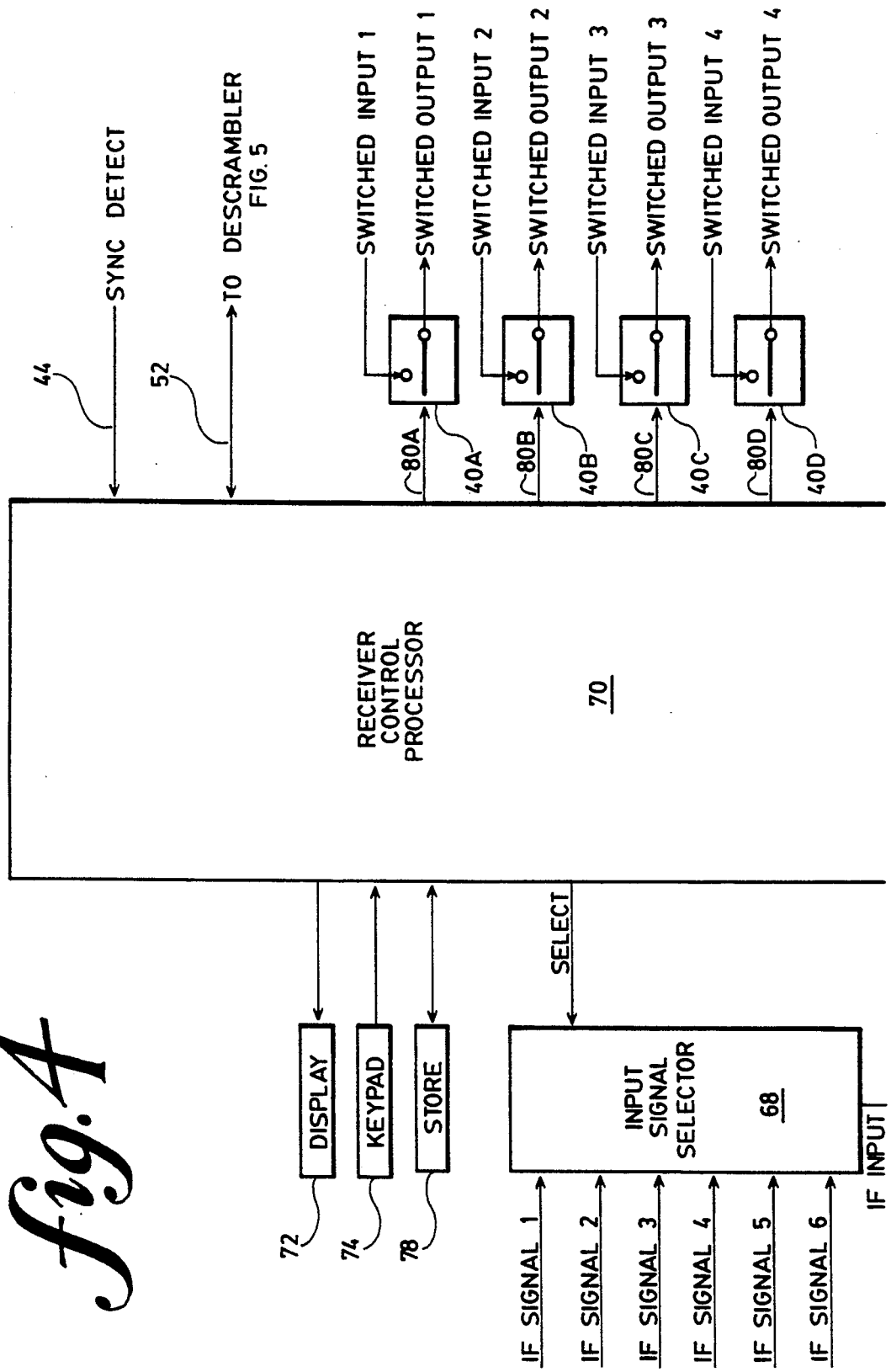

SATELLITE RECEIVER RETUNING SYSTEM

FIELD OF THE INVENTION

The present invention relates to a method and apparatus for controlling alternative programming delivery in a satellite programming distribution system. Specifically, the present invention relates to selectively providing alternative program material such as during the blackout of certain syndicated programming features, or for the delivery of demographically targeted advertising to specific subscriber groups.

BACKGROUND OF THE INVENTION

Video programming is distributed to a wide audience via direct broadcast satellite (DBS) and cable television (CATV) systems. Typically, CATV systems receive their video programming via satellite. Under certain contractual provisions, a specific programming event may be required to be "blacked out" in certain geographic areas. For example, a sports event may be restricted to areas outside of the local market for ticket sales to the live event. Therefore, present video programming delivery systems provide for geographic areas to be selectively blacked out for specific programming events.

Systems for controlling blacked out, regions by geographic designation are well known. For example, U.S. Pat. No. 4,864,615 to Bennett et al describes a tier authorization scheme which may be used to collect subscribers into a blackout group which is assigned to a unique authorization tier. When a program or event begins, those descramblers that do not possess the proper authorization tier are prevented from decoding the received television signal and will therefore be blacked out for the program or event.

In the event that a CATV system is included in a group that is blacked out, the CATV operator desires to provide alternative programming to the CATV subscribers during the blacked out event. To do so, the CATV operator may manually switch to another available signal for the blacked out event. Often, the program provider of the blacked out event will offer alternative programming from another satellite feed during the blackout. The CATV operator sends personnel to the headend site of the CATV system to connect another satellite receiver or retune the original satellite receiver to the alternate satellite feed during the blackout. Following the blackout, the original satellite receiver may be re-connected or manually tuned back to the primary satellite feed. Manually providing alternate switching or retuning of satellite receivers during a blackout is both costly and inefficient.

It is desired to provide a system which automatically selects alternative programming for receiver/descramblers who are viewing an event which is blacked out, and return those receiver/descramblers to the original programming service following the end of the blacked out event.

A related problem exists with regard to local or demographic insertion of advertising for viewing by certain groups of subscribers. A satellite programmer may wish to provide different advertisements for different demographic groups based on geographic areas. Prior art systems for accomplishing local insertion of alternative programming use inband audio tone signalling to control special video insertion equipment. The audible tones, in addition to being annoying to CATV subscribers, do not provide for centralized control over alternative programming delivery by the original satellite programmer.

SUMMARY OF THE INVENTION

The present invention is embodied in a video satellite distribution system, including a satellite receiver and decoder which may be selectively retuned to an alternate satellite video feed by a command message sent in advance from the original satellite video programmer. Specifically, in order to provide for alternative program delivery during a blacked out event, a retune message is sent in advance from the uplink to the satellite receiver. The retune message, which is received and stored only by those satellite receivers in a designated blackout group, provides for an alternative satellite designation and an alternative transponder, and a start time which designates when the receiver is to tune to the alternative satellite feed.

At the beginning of the blacked out event, the satellite decoder commands the satellite receiver to tune to an alternative satellite feed. During the blacked out event, the satellite programmer will send another retune command to the blacked out receiver/descramblers on the alternative satellite feed. Following the alternate programming provided during the blackout, the satellite decoder will command the satellite receiver to retune to the original satellite feed, thereby returning the blacked out receiver/descramblers to the original programming service.

In accordance with a further aspect of the present invention, a satellite receiver and decoder is provided which is responsive to a home channel message transmitted by a satellite video programmer. The home channel message includes a designation of a satellite and a transponder to which the satellite receiver and decoder will retune in order to recover from a loss of synchronization or loss of signal.

A further aspect of the present invention is embodied in a satellite receiver and decoder, responsive to a local insertion control message, including an identification of a switching port, a start time, and a duration for which a local video programming insertion is to occur. The satellite receiver and decoder, is responsive to the stored local insertion control message to insert alternative local video programming beginning at the start time, and for the duration defined in the stored local insertion control message via the closure of an external electrical contact.

The present invention thus provides an alternative programming delivery in a satellite system whereby the satellite programmer has centralized control over the insertion of alternative programming, using a single satellite receiver which is selectively retuned to alternative satellite feeds containing the desired alternative satellite programming and local alternate video programming which is selectively controlled using electrical contact closures.

DESCRIPTION OF THE FIGURES

FIG. 2a is a diagram of the signal formats for the retune message, home channel message, and local insertion message in accordance with the present invention.

FIG. 2b is a time diagram illustrating the delivery of alternative programming material to various groups of receiver/decoders during a blacked out event, in accordance with the present invention.

FIG. 2c is a time diagram illustrating the sequence of various command messages transmitted over a satellite video programming system to control subscriber receivers/decoders in accordance with the present invention.

FIG. 3 is a block diagram of a satellite earth station including a satellite receiver and descrambler embodying the present invention.

DETAILED DESCRIPTION

Figure 1:
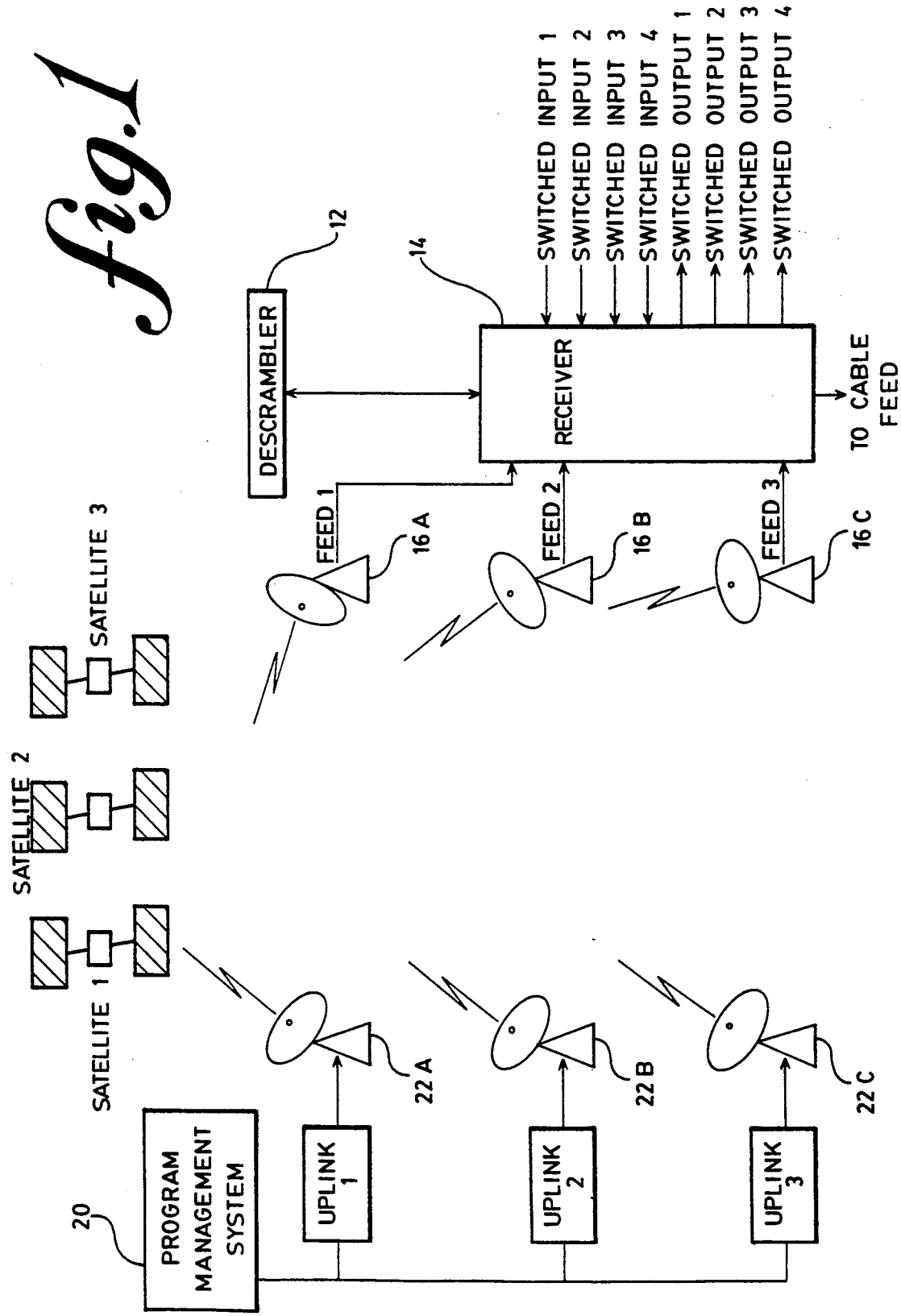
FIG. 1 is a block diagram of a satellite video programming distribution system embodying the present invention, and including a plurality of video programming uplinks, satellites, and video programming feeds.

An overall diagram of a satellite video programming distribution system is shown in FIG. 1. A video programmer management system 20 is coupled to uplink 1, uplink 2 and uplink 3, which respectively provides video bearing signals to satellite uplink antennas 21a, 21b, and 22c. Three geostationary orbiting satellites, i.e., satellite 1, satellite 2, and satellite 3 respectively may receive the transmitted uplink signals, and rebroadcast the received signal to downlink antennas 16a, 16b and 16c. Downlink antennas, 16a, 16b and 16c, receive the satellite signals as feeds 1, 2 and 3, which are coupled to the satellite receiver 14. A satellite video descrambler 12 is coupled to the satellite receiver 14 which provides access control video retuning control, and switched output terminal control signals to the receiver 14. The output of the receiver 14 is the received video signal delivered to the cable feed. Also, for local insertion purposes, four switched input terminals (switched input 1-4) are provided as an input to receiver 14 for switched output connection to four switched output terminals (switched output 1-4).

FIG. 2b illustrates the programming provided on each of the three satellite feeds. For this discussion it may be assumed that feed 1 is satellite 1, transponder 1, that feed 2 is satellite 2, transponder 2, and that feed 3 is satellite 3, transponder 3. As shown in FIG. 2b at time t=0, feed 1 is broadcasting event A while feed 2 is broadcasting event C and feed 3 is broadcasting event E. Groups 1, 2 and 3 are currently receiving programming from feed 1, i.e., event A. Groups 4, 5 and 6 are currently receiving programming from feed 2, i.e., event C, while groups 7, 8 and 9 are currently receiving programming from feed 3, i.e., event E. At time t=1 it is desired to black out groups I, 4 and 9, for the signals from the feeds to which they are currently tuned.

In order to retune group 1 CATV satellite receiver/descramblers subscribers at t=1, so that alternative programming may be provided to replace the blacked out event B program on feed 1, a retune message is sent in advance of event B on feed 1 to those CATV satellite receivers in group 1 only on the feed to which group 1 CATV satellite receiver/ descramblers are currently tuned. The retune message to the satellite receiver for group 1 receiver/descramblers designates the satellite and transponder corresponding to feed 2, and the start time (t=1) at which event B will begin. The other feed still instructs group 1 to retune to feed 1 during event B.

Similarly, in order to retune groups 4 and 9 from event D and event F respectively, a retune message is sent to the CATV satellite receivers in groups 4 and 9 respectively in advance on feeds 2 and 3 respectively. The retune message will include the satellite designation and transponder corresponding to feed 1, and the start time (t=1) for which the retune operation is to be performed. During event D, feeds other than feed 2 still instruct group 4 to remain tuned to event D on feed 2. During event E, feeds other than feed 3 still instruct group 9 to remain tuned to event E on feed 3. Thus, by directing each group of receiver/descramblers on all other satellite feeds to retune to the proper satellite feed, the assurance of correct program blockout control is improved.

Retune messages are sent fairly often (for example, four complete messages every 15 seconds) to increase the assurance that each satellite receiver will receive and store the proper retune message. At time t=1, group 1 satellite receivers will retune to feed 2, and view event D in lieu of blacked out event C. Similarly, at time t=1 satellite receivers corresponding to groups 4 and 9 receiver/descramblers will retune to feed 1 and view event B in lieu of blacked out events C and E respectively.

During the blacked out event, the blacked out groups 1, 4 and 9 may receive further retune messages (now received on the alternative programming feeds) which will permit groups 1, 4 and 9 to retune to their original channel following the blacked out event termination. Therefore, prior to time t=3, group 1 will receive a retune message on feed 2 designating a satellite and a transponder corresponding to feed 1 and a start time corresponding to t=3. Similarly, groups 4 and 9 will receive a retune message on feed 1 designating respective satellites and transponders corresponding to feeds 2 and 3, and a starting time coinciding with the respective termination of events D and F. At time t=3, the satellite receiver for group 1 receiver/descramblers will retune to feed 1, the satellite receiver for group 4 receiver/descramblers will retune to feed 2, while the satellite receiver for group 9 receiver/ descramblers will retune to feed 3.

The system of the present invention provides a great deal of flexibility over the delivery of alternate programming in a satellite video distribution system. Specifically, it is a common occurrence for a sporting event to run overtime causing programming delays. This situation is illustrated in FIG. 2b by the program delay 13 by which event C runs overtime. As a result, it is now necessary to delay the retune of group 4 receiver/descramblers until the time t=2, rather than the time t=1. Group 9 receiver/descramblers are not affected. Group 1 receiver/descramblers will not be affected so long as group 1 receiver/descramblers are allowed to view event C. Group 1 receiver/descramblers will switch to feed 2 at t=1 and view the event in progress (event C).

However, due to the program delay 13, it is necessary to transmit a new retune command to the satellite receivers corresponding to group 4 prior to the time t=1. The new retune command will contain still a designation of satellite 1, transponder 1, but will include a new starting time in which to retune to feed 1.

The sequence of command messages transmitted on feed 1 and feed 2 is illustrated in FIG. 2c. Groups 1 through 9 correspond to tiers 1 through 9, respectively. Message 24, transmitted to the satellite receiver corresponding to group 1 (tier 1) designates that satellite 2, transponder 2 to be tuned at time t=1. Similarly, message 26 on feed 2 received by satellite receivers corresponding to group 4 (tier 4) designates that satellite 1, transponder 1 is to be tuned at time t=1. Messages 24 and 26 are repeated often in order to guarantee their proper reception. For example, message 28 is a repeat of message 24. Also, all feeds repeat messages to retune receiver/descramblers to the proper satellite feed. For example, message 29 on feed 2 directs group 1 receiver descramblers to retune to feed 1 after time t=0.

However, as soon as it becomes apparent that event C is going to run overtime causing a program delay on feed 2 until time t=2, the retune message 30 is transmitted on feed 2. Message 30, sent to the satellite receivers corresponding to group 4 (tier 4) designates that satellite 1, transponder 1 is to be tuned (similar to command message 26) but now the time in which such retuning is to become effective is set equal to time t=2.

At time t=1, satellite receivers corresponding to group 1 receiver/descramblers will retune to view feed 2. At time t=2, the satellite receiver/descramblers corresponding to group 4 will retune to view feed 1.

Following time t=2, a retune message 32 is sent to the satellite receivers corresponding to group 4 CATV satellite receivers, designating that group 4 satellite receivers will retune to satellite 2, transponder 2 at time t=3. The purpose of message 32 is to assure that group 4 will return to feed 2 (the original programming feed) at the termination of the blacked out event B. Similarly, the purpose of message 34 (now transmitted on feed 2) is to assure that group 1 will return to feed 1 (the original programming feed) at the termination of the blacked out event D.

Finally, it is necessary to return group 9, currently viewing feed 1, to feed 3 (the original program for group 9 before the blackout) at time t=3 at the termination of blacked out event F. Message 36, transmitted on feed 1, provides the necessary message to satellite receivers corresponding to group 9, designating a retune command to satellite 3, transponder 3 at time t=3.

A block diagram of a satellite earth station comprising a satellite receiver 14 and a satellite descrambler 12 is shown in FIG. 3. Three separate satellite receiving antennas may provide feed 1, feed 2 and feed 3 to low noise block converters (LNB1-LNB6). Specifically, feed 1 is coupled to LNB1 and LNB2 which provide for reception of the respective horizontal and vertically polarized signals on IF signal 1 and IF signal 2 to receiver 14. Also, feed 2 is coupled to LNB3 and LNB4 which provide respective horizontal and vertically polarized satellite transponder signals to IF signal 3 and IF signal 4 to receiver 14. Finally, feed 3 is coupled to LNB5 and LNB6 which provide respective horizontal and vertically polarized transponder signals on IF signal 5 and IF signal 6 to receiver 14.

Receiver 14 communicates with descrambler 12 through a variety of interface signals. Unclamped video from receiver 14 is transmitted to decoder 12 on conductor 42. A sync detect signal from descrambler 12 is provided on conductor 44 to receiver 14, as is the descrambled video signal on conductor 46, and the descrambled left and right audio signals on conductors on 48 and 50 respectively. The descrambler 12 and receiver 14 exchange inter-processor messages for respective control on data bus 52. The output of receiver 14, provided to the CATV system cable feed is the video output 64, and the left and right stereo audio signals on conductors 58 and 62 respectively. Also provided is a baseband video output 66 and a monaural audio output 60. Receiver 14 also provides for switching one of four video signals as locally generated, alternate video programming material. The switched input terminals 1-4 and switched output terminals 1-4 respectively, which are used at the satellite earth station for insertion of local alternative programming. That is, depending on which of the four pair of switched terminals is closed, one of four local sources of alternate programming will be inserted during the period of time that the switch is closed.

Figure 4:
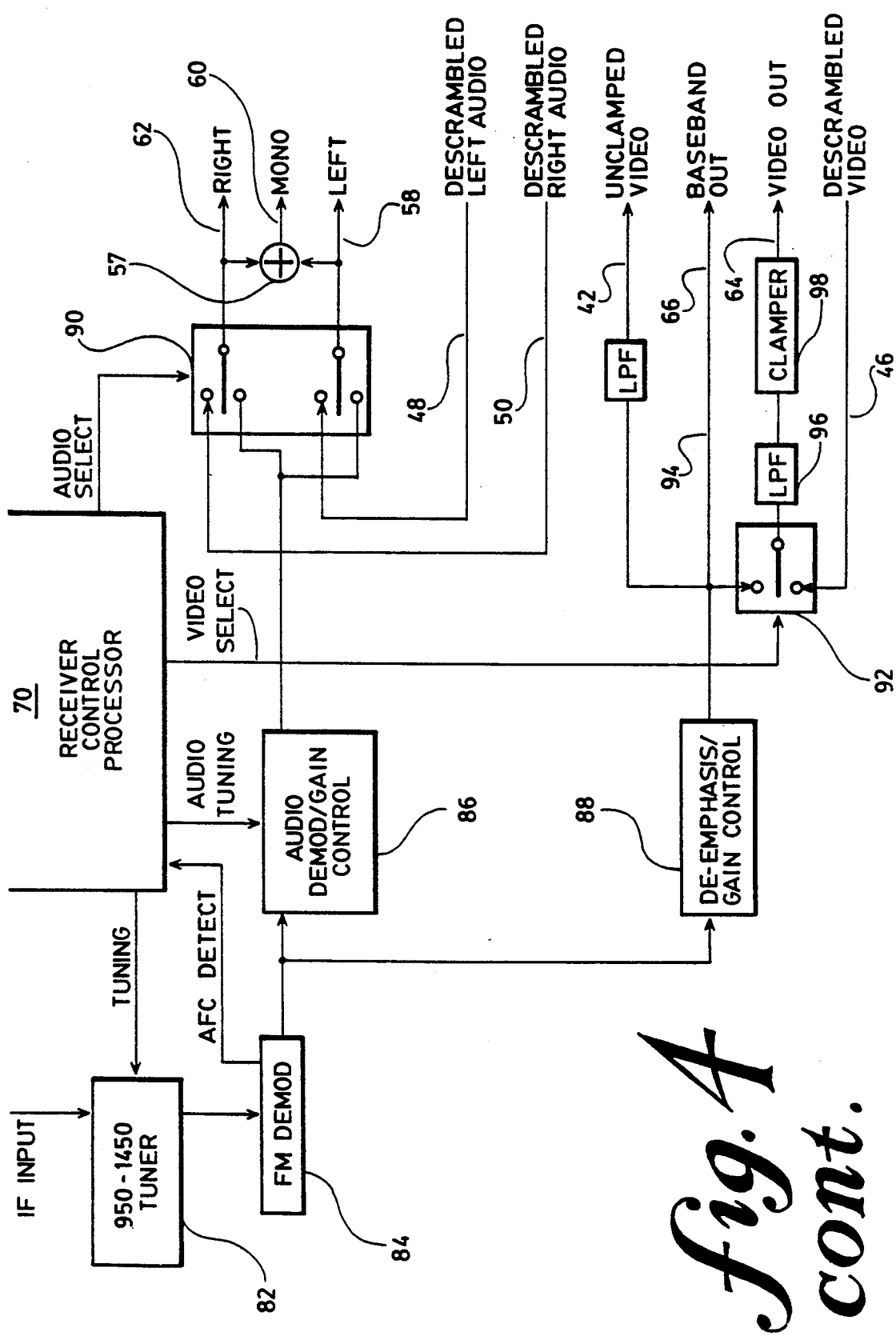
FIG. 4 is a block diagram of a satellite receiver for use in conjunction with the present invention.

A more detailed block diagram of a satellite receiver embodying the present invention is shown in FIG. 4. A receiver control processor 70 is coupled to an operator keyboard 74 and an operator display 72 for manual operation. A memory store 78 is coupled to receiver control processor 70. Memory store 78 holds information needed to translate a desired satellite designation and transponder identity into information needed to select the proper IF signal, and then tune to the desired transponder frequency. The receiver control processor 70 is also responsive to commands from keyboard 74 manually entered in order to provide for alteration of the frequency plan and other information in the store 78. In addition to the keypad 74 entry, the receiver control processor 70 is responsive to inter-processor messages on data bus 52 from the descrambler 12 to perform functions identical to those that can be performed from the keyboard, so that the memory store 78 can be remotely programmed from the satellite up ink facility.

An input signal selector 68 couples IF signal 1 through IF signal 6 to a multiplexer controlled by the select signal from control processor 70 to provide a selected IF input signal to tuner 82. Tuner 82 is controlled by control processor 70 by a tuning command signal. The output of tuner 82 is coupled to an FM demodulator 84 which provides a video signal to an audio demodulator/gain control circuit 86 and a de-emphasis/gain control circuit 88.

Four single pole, single throw switches, 40a, 40b, 40c, and 40d are provided responsive to control signals 80a, 80b, 80c, and 80d respectively from receiver control processor 70. The switching terminals of the single pole, single throw switches 40a-40d are coupled to the respective switched input terminals 1-4 and switched output terminals 1-4 respectively. A double pole, double throw switch 90 responsive to an audio select signal from the receiver control processor 70 couples the output of the audio demodulator/gain control circuit 86 to the right and left stereo output signals on conductor 62 and 58 respectively. An audio summing circuit 57 coupled to the left and right stereo channels provides a sum output representing the monaural audio program on conductor 60. Two other terminals of double pole, double throw switch 90 are coupled to the descrambled left and right audio channels on conductors 48 and 50 respectively from descrambler 12. The output of the de-emphasis/gain control circuit 88 is provided as a baseband output signal on conductor 66, and through a low pass filter 94, is provided as unclamped video to the descrambler 12 on conductor 42.

A single pole, double throw switch 92 responsive to a control signal from receiver control processor 74 switches either the baseband output signal from conductor 66 or the descrambled video from the descrambler 12 on conductor 44 through low pass filter 96 and clamper 98 as the descrambled video output on conductor 64.

Figure 5:
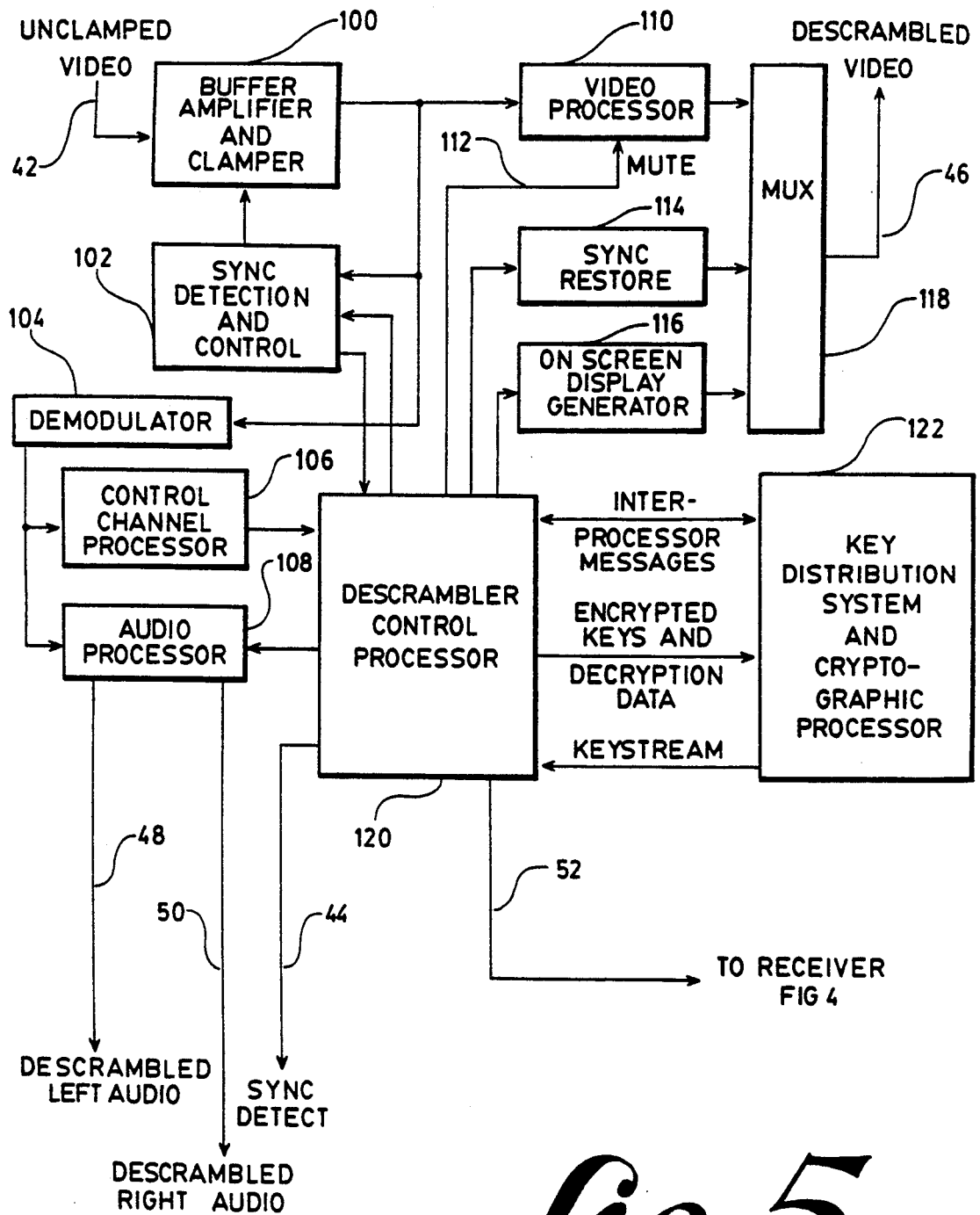
FIG. 5 is a block diagram of a satellite descrambler in accordance with the present invention.

A block diagram of descrambler 12 is illustrated in FIG. 5. A buffer amplifier and clamper circuit 100 receives the unclamped video on conductor 42 from receiver 14. The output of the buffer amplifier and clamper circuit 100 is coupled to a sync detection and control circuit 102 and a demodulator 104. The output of demodulator 104 is coupled to a control channel processor 106 which detects the control data channel carried on the scrambled video signal. The demodulator 104 is further coupled to an audio processor 108 which detects the digital audio carried on the scrambled video signal. An encrypted digital audio and auxiliary data system suitable for use with the present satellite receiver retuning system may be found in U.S. Pat. No. 4,608,456. A descrambler control processor 120 and a key distribution and cryptographic processor 122 control the operation of the descrambler 12. A video processor 110, which inverts the video portion of the received waveform, is also responsive to a mute control signal on conductor 112 to provide a blank background on the video screen during which time the descrambler provides diagnostic information as an on-screen display for installation and testing.

Descrambler control processor 120 also controls a sync restoration circuit 114 and an on-screen display generator 116. The output of the video processor 120, the sync restore circuit 114 and the on-screen display generator 116 are combined in a multiplexer 118, the output of which provides descrambled video on conductor 46. Cryptographic processor 122 acts as an auxiliary co-processor to the main descrambler control processor 120 which implements the satellite scrambling audio encryption and key distribution system. A satellite programming encryption system suitable for use with the present invention is described in U.S. Pat. No. 4,563,702. A scrambled satellite system access control system describing a control datastream and key distribution system suitable for use with the present invention may be found in U.S. Pat. No. 4,613,901.

In operation, a retune message of the format shown in FIG. 2a is sent over the control data stream of the satellite feed to which the receiver 14 is currently tuned. The control channel processor 106 of FIG. 5 forwards the retune message to descrambler control processor 120. The descrambler control processor 120 first checks the tier indication of the received message to determine whether or not the message applies to the receiving descrambler or not. If the tier bit indicated in the received message matches a corresponding tier bit in the authorization mask of the descrambler, then the retune message is stored in the descrambler 12. As indicated in FIG. 3, descrambler 12 includes a memory 59 for storing the current retune message.

Similarly, the received local insertion message having the format shown in FIG. 2a is received by control channel processor 106 and forwarded to descrambler control processor 120 and stored. Local insertion messages are broadcast globally without an address and are received by all receiver/descramblers tuned to the same satellite feed on which the local insertion message is broadcast. As shown in FIG. 3, descrambler 12 includes a memory 61 for storing four separate switch port closure messages for switch ports 1 through 4.

The home channel message format shown in FIG. 2a is processed also processed in a similar manner. Control channel processor 106 in FIG. 5 forwards the received home channel message to descrambler control processor 120. If the tier bit indicated matches an authorized bit in the descrambler authorization mask, then the message is intended for the current descrambler. If so, descrambler control processor 120 stores the information received regarding the home channel for the receiver in memory 54 in descrambler 12.

Should loss of synchronization occur, the receiver 14 would retrieve the home channel information from memory 54 and retune to the designated channel and responder so that the descrambler receiver would once again receive messages from the designated uplink.

After the retune message is stored in memory 59 and the switch port closure information is stored in memory 61, the descrambler control processor 120 compares the time stored in such messages with the current value of real time. Any received retune message or switch port closure message supersedes previously received messages and overwrites previous values in memories 59 and 61.

When the current time is greater than or equal to the time specified in the retune message in memory 59, descrambler control processor 120 commands receiver processor 70 through data bus 52 to begin to tune to the satellite and transponder designated in the retune message. Receiver control processor 70 communicates with local store 78 which provides frequency and channel information corresponding to the designated satellite and transponder. The contents of store 78 may be either manually updated by the operator via keypad 74, or in the alternative can be downloaded from the satellite programmer uplink facility. Receiver control processor 70 then selects a satellite feed by selecting IF signal 1 through IF signal 6 via signal selector 68.

The selected IF signal is applied to a tuner 82 which is responsive to a tuning control signal from the receiver control processor 70 to tune to the desired frequency. The tuner 82 output is coupled to the FM demodulator 84 which provides an automatic frequency detect signal output to the receiver control processor 70 to facilitate locking to the desired tuned frequency. The FM demodulator 84 outputs a demodulated TV waveform which may be scrambled or unscrambled, to an audio demodulator and gain control 86 which processes the audio subcarrier portion of the demodulated signal in response to an audio tuning signal from the receiver control processor 70 and provides the resultant audio to the audio selector switch 90. The audio selector switch 90 is responsive to the audio select signal from the receiver control processor 70 to select either the audio presented at the output of the audio demodulator/gain control circuit 86 or the stereo audio signal from the descrambler on conductors 48 and 50.

The output of the FM demodulator 84 is also processed by the de-emphasis/gain control circuit 88 to provide a baseband output. The baseband signal is provided through low pass filter 94 to the descrambler as an unclamped video signal on conductor 42.

At the descrambler, in FIG. 5, the unclamped video on conductor 42 is connected to the buffer amplifier and clamper circuit 100, which provides an interface for receiving the unclamped video signal from the receiver and includes an AGC amplifier that is adjusted in a conventional manner by a gain control circuit (not shown) from the descrambler control processor 120. The filtered and clamped scrambled signal waveform is provided to the sync detection and control circuit 102 which detects the predetermined synchronization sequence in line 1, field 1 of the received composite waveform, and further provides a frame sync signal to the descrambler control processor 70.

Demodulator 104 converts the clamped and buffered waveform into I and Q data bit streams for application to the control channel processor 106 and audio processor 108. The control channel messages are sampled and decoded by the control channel processor 106 and forwarded to the descrambler control processor 120 and thereafter to the key distribution and cryptographic processor 122. The received scrambled signal is processed in accordance with the normal processing of scrambled signals. That is, if a descrambler is authorized (and since the receiver has been commanded to retune to the current satellite feed, it is presumed that the descrambler is authorized), then the key stream signals from the cryptographic processor 122 will permit the descrambling of the digital audio by the audio processor 108 and the descrambling of the inverted video by the video processor 110. The descrambled video signal at the output of video processor 110 and the output from the synchronization restore circuit 114 are combined in multiplexer 118 to form the descrambled video signal on conductor 46. Thus, the receiver and descrambler of the present invention have been automatically retuned to an alternate video programming feed in response to a command message transmitted via the satellite signal distribution system.

The process for affecting switch disclosure 40a, 40b, 40c, and 40d, in response to switch port numbers for local insertion of alternate video programming is somewhat analogous to that affecting a retune of the satellite receiver. To cause a local programming insertion, the uplink transmits a local insertion message having a format as shown in FIG. 2a. The descrambler 12 receives the local insertion message and stores the message in the memory buffer 61 of the descrambler 12, as shown in FIG. 3. Thereafter, the start time associated with the local insertion message is checked against the current time. The descrambler sends a contact closure command to the receiver at the appropriate start time or immediately if the contact closure event is in the past and has not yet been completed, indicating which of the relays 40a through 40d should be closed. Once the contact closure of the appropriate relay has been affected, the descrambler waits an amount of time indicated by the duration field of the received local insertion message, and then sends a command to the receiver to open the associated relay contact, thus completing the insertion of the local programming.

Thus, by the use of the present satellite receiver retuning system, the satellite programmer has centralized control over the timing of program blackouts and alternate program insertion, as well control over the source of alternate programming, whether by alternate satellite feed or by local switched signals.

What is claimed is:

1. A method for controlling alternative programming delivery in a satellite system having first and second satellite feeds and at least one downlink including a receiver/descrambler, said method comprising:
    transmitting a first program on said first satellite feed;
    transmitting a second program on said second satellite feed;
    transmitting a control message on said first satellite feed to said receiver/descrambler, said control message including the identification of said second satellite feed, and the indicated time at which said receiver/descrambler is to retune between said first and said second satellite feeds;
    receiving said first program at said receiver/descrambler on said first satellite feed;
    receiving said control message at said receiver/descrambler on said first satellite feed;
    comparing said indicated time to the current time; and
    retuning said receiver/descrambler to said second satellite feed when said current time is greater than said indicated time, thereby switching said receiver/descrambler between said first and second programs.

2. A method in accordance with claim 1, further including transmitting said control message on said first satellite feed before said indicated time at which said receiver/descrambler at said downlink is to return to said second satellite feed.

3. A method in accordance with claim 1, further including transmitting said control message on said first satellite feed after said indicated time at which said receiver/descrambler at said downlink is to retune to said second satellite feed.

4. A method in accordance with claim 1, further comprising:
    transmitting a second control message to said receiver/descrambler, said second control message including the identification of said first satellite feed, and a second indicated time at which said receiver/descrambler is to retune between said second and said first satellite feeds;
    receiving said second control message at said receiver/descrambler;
    comparing said indicated time to the current time; and
    retuning said receiver/descrambler to said first satellite feed when said current time is greater than said indicated time, thereby switching said receiver/descrambler between said second and first programs.

5. A method in accordance with claim 4, further comprising:
    transmitting a third control message to said receiver/descrambler,
    said third control message including the identification of a home channel satellite feed;
    receiving said third control message at said receiver/descrambler;
    detecting a fault condition at said downlink;
    retuning said receiver/descrambler to said home channel satellite feed after detecting said fault condition at said downlink; and
    receiving said home channel satellite feed.

6. In a satellite system uplink facility, a method for controlling alternative programming delivery in said satellite system including at least one downlink have a receiver/descrambler, said method comprising:
    transmitting a first program on a first satellite feed;
    transmitting a second program on a second satellite feed; and
    transmitting a control message on said first satellite feed to said receiver/descrambler, said control message including the identification of said second satellite feed, and the indicated time at which said receiver/descrambler is to retune between said first and said second satellite feeds.

7. In a downlink facility for a satellite system having first and second satellite feeds, said satellite system including transmitting a control message for controlling alternative programming delivery in said satellite system, a method comprising:

receiving a first program on said first satellite feed;

receiving said control message indicating the identification of a second satellite feed, and the indicated time at which said receiver/descrambler is to retune between said first and said second satellite feeds;

comparing said indicated time to the current time;

retuning said receiver/descrambler when said current time is greater than said indicated time between said second and first satellite feeds at said second indicated time; and receiving a second program on said second satellite feed.

8. A method for controlling insertion of alternative programming in a satellite system having at least on uplink and at least one downlink including a receiver/descrambler, said method comprising:

transmitting a program on a satellite feed;

transmitting a control message to said receiver/descrambler, said control message including the identification of a local contact closure to control a source of alternate programming, said control message further providing an indicated start time at which said contact closure activates said source of alternative programming, and a time duration for which said contact closure is to provide said activation to said source of alternative programming;

receiving said program and said control message at said downlink;

comparing said indicated start time to the current time activating said contact closure when said current time is greater than said indicated start time to switch between said program and said alternative programming; and deactivating said contact closure when said current time is greater than said indicated start time plus said time duration thereby to switch between said alternative programming and said program.

9. In a satellite system uplink facility, a method for controlling local insertion of alternative programming in a satellite system having at least one uplink and at least one downlink including a receiver/descrambler, said method comprising:

transmitting a program on a satellite feed; and transmitting a control message to said receiver/descrambler, said control message including the identification of a local contact closure to control a source of alternative programming, said control message further providing an indicated start time at which said contact closure is to activate said source of alternative programming, and a time duration for which said contact closure is to provide said activation for said source of alternative programming.

10. In a satellite system downlink facility having a receiver/descrambler, said satellite system including transmitting a control message indicating a contact closure, a start time and a time duration for controlling local insertion of alternative programming, a method comprising:

receiving said program and said control message at said receiver/descrambler;

comparing said start time to the current time activating said contact closure when said current time is greater than said indicated start time indicated by said control message, to control a source of alternative programming; and deactivating said contact closure when said current time is greater than said indicated start time plus said time duration indicated by said control message, thereby to switch between said alternative programming and said program.

11. An apparatus for controlling alternative programming delivery in a satellite system having at first and second satellite feeds and at least one downlink including a receiver/descrambler, said apparatus comprising:

means for transmitting a first program on said first satellite feed;

means for transmitting a second program on said second satellite feed;

means for transmitting a control message on said first satellite feed to said receiver/descrambler, said control message including the identification of said second satellite feed, and the indicated time at which said receiver/descrambler is to retune between said first and said second satellite feeds;

means for receiving said first program at said receiver/descrambler on said first satellite feeds;

means for receiving said control message at said receiver/descrambler on said first satellite feed;

means for comparing said indicated time to the current time; and means for returning said receiver/descrambler to said second satellite feed when said current time is greater than said indicated time, thereby switching said receiver/descrambler between said first and second programs.

12. An apparatus in accordance with claim 11, further including means for transmitting said control message on said first satellite feed before said indicated time at which said receiver/descrambler at said downlink is to retune to said second satellite feed.

13. An apparatus in accordance with claim 11, further including means for transmitting said control message on said first satellite feed after said indicated time at which said receiver/descrambler at said downlink is to retune to said second satellite feed.

14. An apparatus in accordance with claim 11, further comprising:

means for transmitting a second control message to said receiver/descrambler, said second control message including the identification of said first satellite feed, and a second indicated time at which said receiver/descrambler is to retune between said second and said first satellite feeds;

means for receiving said second control message at said receiver/descrambler;

means for comparing said indicated time to the current time; and means for returning said receiver/descrambler to said first satellite feed when said current time is greater than said indicated time, thereby switching receiver/descrambler between said second and first programs.

15. An apparatus in accordance with claim 14, further comprising:

means for transmitting a third control message to said receiver/descrambler, said third control message including the identification of a home channel satellite feed;

means for receiving said third control message at said receiver/descrambler;

means for detecting a fault condition at said downlink;

means for retuning said receiver/descrambler to said home channel satellite feed after detecting said fault condition at said downlink; and means for receiving said home channel satellite feed.

16. In a satellite system uplink facility, an apparatus for controlling alternative programming delivery in said satellite system including at least one downlink having a receiver/descrambler, said apparatus comprising:

means for transmitting a first program on a first satellite feed;

means for transmitting a second program on a second satellite feed; and means for transmitting a control message on said first satellite feed to said receiver/d(e)scrambler, said control message including the identification of said second satellite feed, and the indicated time at which said receiver/descrambler is to retune between said first and said second satellite feeds.

17. In a downlink facility for a satellite system having first and second satellite feeds, said satellite system including means for transmitting a control message for controlling alternative programming delivery in said satellite system, an apparatus comprising:

means for receiving a first program on said first satellite feed;

means for receiving said control message indicating the identification of a second satellite feed, and the indicated time at which said receiver/descrambler is to retune between said first and said second satellite feeds;

comparing said indicated time to the current time means for retuning said receiver/descrambler between said second and said first satellite feeds when the current time is greater than said indicated time;

means for receiving a second program on said second satellite feed.

18. An apparatus for controlling insertion of alternative programming in a satellite system having at least one uplink and at least on downlink including a receiver/descrambler, said apparatus comprising:

means for transmitting a program on a satellite feed;

means for transmitting a control message to said receiver/descrambler, said control message including the identification of a local contact closure to control a source of alternate programming, said control message further providing an indicated start time at which said contact closure is to activate said source of alternative programming, and a time duration for which said contact closure is to provide activation for said source of alternative programming;

means for receiving said program and said control message at said downlink;

comparing said indicated time to the current time means for activating said contact closure when said current time is greater than said indicated time to switch between said program and said alternative programming; and means for deactivating said contact closure when said current time is greater than said indicated time plus said time duration, thereby to switch between said alternative programming and said program.

19. In a satellite system uplink facility, an apparatus for controlling local insertion of alternative programming in a satellite system having at least one uplink and at least one downlink including receiver/descrambler, said apparatus comprising:

means for transmitting a program on a satellite feed; and means for transmitting a control message to said receiver/descrambler, sad control message including the identification of a local contact closure to control a source of alternative programming, said control message further providing an indicated start time at which said contact closure is to activate said source of alternative programming, and a time duration for which said contact closure is to provide activation from said source of alternative programming.

20. In a satellite system downlink facility having a receiver/descrambler, said satellite system including transmitting a control message indicating a contact closure, a start time, and a time duration for controlling local insertion of alternative programming, an apparatus comprising:

means for receiving said program and said control message at said receiver/descrambler;

comparing said indicated time to the current time means for activating said contact closure when said current time is greater than said indicated start time indicated by said control message, to control a source of alternative programming; and means for deactivating said contact closure when said current time is greater than said indicated start time plus a time duration indicated by said control message, thereby to switch between said alternative programming and said program.

* * * * *